(No Model.)

C. C. ALLEN.
VALVE FOR PNEUMATIC TIRES FOR BICYCLES OR OTHER VEHICLES.

No. 599,581. Patented Feb. 22, 1898.

Witnesses.
Robert Everett.
Geo. N. Rea.

Inventor:
Charles C. Allen,
By James L. Norris.
Atty.

UNITED STATES PATENT OFFICE.

CHARLES C. ALLEN, OF LINCOLN, NEBRASKA.

VALVE FOR PNEUMATIC TIRES FOR BICYCLES OR OTHER VEHICLES.

SPECIFICATION forming part of Letters Patent No. 599,581, dated February 22, 1898.

Application filed July 30, 1897. Serial No. 646,535. (No model.)

*To all whom it may concern:*

Be it known that I, CHARLES C. ALLEN, a citizen of the United States, residing at Lincoln, in the county of Lancaster and State of Nebraska, have invented new and useful Improvements in Valves for Pneumatic Tires for Bicycles or other Vehicles, of which the following is a specification.

My invention relates to valves for the pneumatic tires for bicycles and other vehicles.

It is the purpose of said invention to provide not only a simple, cheap, and highly efficient valve of this type, but to provide a construction whereby it may be used to inflate tires by pumps of different construction, so that a wheel is not necessarily disabled by the loss of the pump which goes with it, provided the rider can borrow a pump.

It is my aim also to provide a valve for a pneumatic tire which shall be securely held in its valve-casing and sealed by insertion therein in such manner that no leakage or escape of air from the tire can take place.

It is my further purpose to reduce the number of parts of which the valve is formed to avoid the necessity of using washers or other packing and simplify and improve the construction and operation of the several parts of the valve, while at the same time I reduce the cost of manufacture and am therefore enabled to furnish an extremely simple, durable, and efficient valve at a low cost.

My invention consists in the several novel features of construction and new combinations of parts hereinafter fully described and then particularly pointed out and defined in the claims.

For the purposes of the following description reference will be had to the accompanying drawings, in which—

Figure 1:
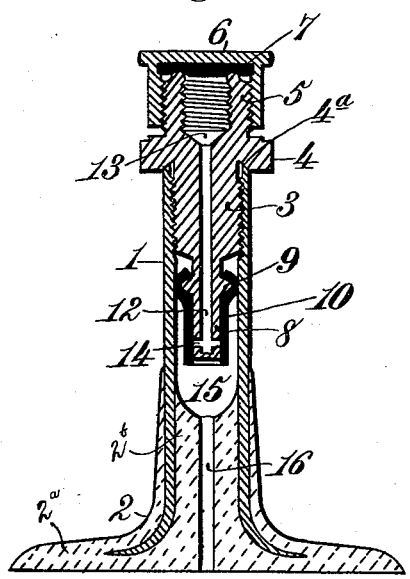
Figure 2:
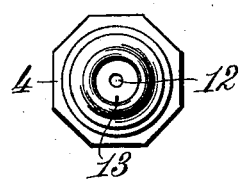
Figure 3:
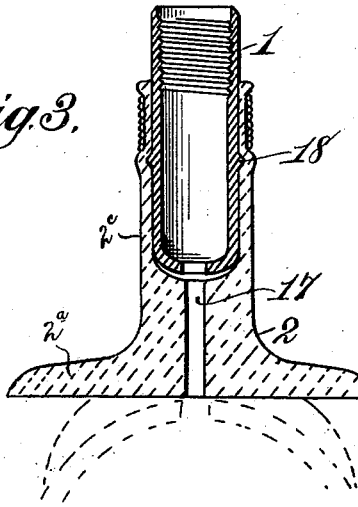

Figure 1 is a central section of the valve arranged in its casing. Fig. 2 is a plan view of the valve with the cap removed. Fig. 3 is a central vertical section of the valve-casing, the valve proper being removed, showing a slightly-modified construction.

The reference-numeral 1 in said drawings indicates a valve-casing usually of cylindrical form. It is associated with a rubber valve-mounting 2, which comprises a base portion 2ª and an upwardly-extending cylindrical portion 2ᵇ, integral with said base portion, a central air-passage 16 extending vertically through the mounting. With this mounting the valve-casing may permanently or detachably be united. In either form the casing is made in one piece and provided with an internal thread. The valve-mounting 2 enters the lower end of the casing in one form of construction (seen in Fig. 1) and also surrounds a portion of the exterior.

The valve proper is made in a single piece and consists of a body portion 3, which fits within the casing and has a male thread engaging the internal thread of the casing. Above the threaded portion is an integral collar 4, preferably of polygonal form, to fit it to be engaged by an ordinary wrench or turned by the finger and thumb. Said collar extends beyond the outer face of the casing, and in the angle with the latter a channel 4ª is formed to receive the edge of the casing, which is beveled to enter said channel. Above the collar a neck 5 extends upward and is provided with an external and an internal screw-thread, the former being adapted to engage a threaded cap 6, which may contain a washer 7, the latter being pressed by the cap against the open end of the neck.

At the lower end of the valve-body is a hanging stem 8 of less diameter than the interior of the casing, and at a point a little below the union of this stem with the body of the valve is formed a circular rib or collar 9, having a greater outside diameter than the stem, but less than the interior of the casing. A short sleeve of elastic rubber tubing 10 is drawn over the stem, its upper end inclosing the rib or collar 9, the wall of the elastic sleeve being of such thickness that it will be pressed forcibly against the inner face of the casing, thereby making an efficient seal which will be a valuable protection against leakage of air, besides serving as a lock to hold the valve securely in the valve-casing.

The stem and body of the valve are provided with a central channel 12, which terminates above in a chamber 13 in the neck of the valve and below at a cross-cut opening 14, which is formed a little above the lower end of the neck. The elastic sleeve 10 covers the openings 14, and being of such diameter as to closely hug the stem it forms an effectual prevention of the escape of air from the tire, since the pressure of this air upon the exterior of said tube will press it more closely upon and more perfectly close these openings. Air forced into the tire, however, will readily lift the elastic tube off said openings and find a channel or channels by which it will pass into a chamber 15, in which the stem lies, and thence through a passage 16 into the tire.

The externally and internally threaded neck is adapted to receive any one of a plurality of pumps—such, for example, as the "G. & J." pump or "Palmer" pump. Thus should a tire become deflated while the rider is not provided with his own pump he can, if he finds another rider, borrow a pump of another make and the chances are that he will be able to pump his tire.

I may construct the casing, as shown in Fig. 3, by making it removable. The lower end is rounded to lie in an opening in the valve-mount 2 and has an opening registering with a channel 17 for the air. In this construction the valve-mount 2 has an upwardly-extending cylindrical portion 2$^c$, which surrounds the lower end of the valve-casing. Instead of screwing the casing into the mount I may provide it with a low rib 18 on the exterior, which will engage a corresponding channel in the inner face of the casing.

What I claim is—

1. A valve for a pneumatic tire, comprising a rubber valve-mount having an upwardly-extending cylindrical portion provided with a central air-passage, a valve-casing secured at its lower portion in said mounting and having interior threads at its upper end, a valve screwed therein and having a hanging stem lying in a chamber of greater diameter than said stem, a rib or collar on the exterior of said stem, and an elastic tube closely surrounding said rib and forced by it against the inner face of the casing, and extending down on the stem to cover openings in the stem which communicate with the passage in the valve-mount, substantially as described.

2. A valve for a pneumatic tire comprising a rubber valve-mount having an upwardly-extending cylindrical portion provided with a central air-passage, a valve-casing secured at its lower portion in said mounting and having interior threads at its upper end, and a valve-stem screwed therein having a valve-controlled opening communicating with the central passage in the valve-mounting, substantially as described.

3. A valve for a pneumatic tire comprising a rubber valve-mount having an upwardly-extending cylindrical portion provided with a central air-passage, a valve-casing having its lower portion embedded in said valve-mount and surrounding said central passage, and having interior threads at its upper end, a valve-chamber provided at the upper end of the valve-mount within the casing and communicating with the central passage, and a valve-stem screwed in the casing and having a valve-controlled opening communicating with the valve-chamber, substantially as described.

4. As a new article of manufacture, a valve for a pneumatic tire comprising a rubber valve-mount having an upwardly-extending cylindrical portion provided with a central air-passage, a valve-casing having its lower portion embedded in said valve-mount and surrounding said central passage, and having interior threads at its upper end, a valve screwed therein and having a hanging stem lying in a chamber of greater diameter than said stem, and having, at its outer end, interior and exterior screw-threads, a cap adapted to screw on said exterior threads, a rib or collar on the exterior of said stem, and an elastic tube closely surrounding said rib and forced by it against the inner face of the casing, and extending down on the stem to cover openings in the stem which communicate with the passage in the valve-mount, substantially as described.

In testimony whereof I have hereunto set my hand in presence of two subscribing witnesses.

CHARLES C. ALLEN.

Witnesses:
 WILLARD HAMMOND,
 CHARLES HAMMOND.